(12) United States Patent
Luo et al.

(10) Patent No.: US 6,782,157 B1
(45) Date of Patent: Aug. 24, 2004

(54) BIDIRECTIONAL OPTICAL INTERLEAVER

(75) Inventors: Huali Ariel Luo, Fremont, CA (US); Kevin Sullivan, Fremont, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 276 days.

(21) Appl. No.: 10/038,882

(22) Filed: Jan. 2, 2002

(Under 37 CFR 1.47)

(51) Int. Cl.[7] .............................. G02B 6/28; H04J 14/00
(52) U.S. Cl. ............................. 385/24; 385/42; 385/50; 398/68; 398/82; 398/93
(58) Field of Search .............................. 385/24, 39–50, 385/68–97

(56) References Cited

U.S. PATENT DOCUMENTS

| | | | | | |
|---|---|---|---|---|---|
| 5,074,634 A | * | 12/1991 | Takahashi | ..................... | 385/24 |
| 5,652,814 A | * | 7/1997 | Pan et al. | ..................... | 385/24 |
| 5,809,190 A | * | 9/1998 | Chen | ............................ | 385/43 |
| 6,160,932 A | * | 12/2000 | Huang et al. | .................. | 385/24 |
| 6,208,444 B1 | * | 3/2001 | Wong et al. | ................... | 398/9 |
| 6,567,581 B2 | * | 5/2003 | Cao | ............................ | 385/24 |
| 6,636,661 B1 | * | 10/2003 | Zeng | ............................ | 385/24 |

* cited by examiner

*Primary Examiner*—Akm Enayet Ullah
*Assistant Examiner*—Jerry T Rahll
(74) *Attorney, Agent, or Firm*—Mayer Fortkort & Williams, PC; Mark K. Young, Esq.; Stuart H. Mayer, Esq.

(57) ABSTRACT

The abstract is amended to read, "An inventive method and apparatus is provided by a bidirectional optical 1×2 device formed by a cascade of three optical 2×2 devices. Each 2×2 device is bidirectional where optical signals propagate through the 2×2 device in the forward and backward directions simultaneously. The demultiplexing and multiplexing occur simultaneously to thereby perform bidirectional 1×2 optical demultiplexing and 2×1 optical multiplexing in the 1×2 device."

28 Claims, 3 Drawing Sheets

BIDIRECTIONAL OPTICAL INTERLEAVER

BACKGROUND OF THE INVENTION

This invention relates to optical communication systems, and more particularly, to a bidirectional optical interleaver.

Demand for voice and data bandwidth in telecommunications networks continues to increase as population grows, work habits evolve (for example, the increased reliance on telecommuting and video/teleconferencing) and business and personal usage of internet-based telecommunications accelerates. Network operators and telecommunications service providers face an increasingly competitive environment that demands low operating and infrastructure costs, and fast supply of new capacity. Operators and service providers are thus motivated to deploy optical telecommunications equipment that maximizes feature and function density within their facilities.

The telecommunications industry has been actively working to develop new technologies to increase network capacity while continuing to meet the financial expectations experienced in today's less regulated telecommunication landscape. Of particular importance has been the emergence of wavelength division multiplexing ("WDM"), which supports the transmission of multiple optical channels (each channel having a different wavelength) on a single fiber. Each channel is modulated with a different information signal to thus provide a substantial increase in data and voice carrying capacity without requiring the installation of new transport media, such as optical cables, in the network.

Dense wavelength division multiplexing ("DWDM") technology is developing as an approach to scale up network capacity even further. In DWDM technology, the optical channels are packed more tightly within the available transmission spectrum. Individual optical channels thus become more closely spaced. Recently, 400 and 200 GHz spacings were common for optical channels. As the state of the art improved, 100 GHz and then 50 GHz channel spacing has become more common. Optical interleaving products have been introduced to address capacity needs by interleaving multiple sets of optical channels into a more densely packed stream. In its simplest form, with 2×1 interleaving, two subsets of optical channels are multiplexed into a single set with half the channel spacing of the subsets. A 1×2 deinterleaver operates in a complementary manner to demultiplex a set of optical channels into two subsets of optical channels where each subset has twice the channel spacing of the input set. The single term "interleaver" is typically used to refer to both multiplexing and demultiplexing functions. Currently, interleavers may be used to support either multiplexing or demultiplexing, but not both functions simultaneously.

Interleavers are utilized in transmission applications include multiplexing (and demultiplexing) in DWDM networks. Optical Add/Drop Multiplexing ("OADM") is another common application. In addition, interleavers may be deployed as an interface among transmission streams having unequal channel spacings to allow existing networks to be gracefully scaled upwards to meet future capacity demands. While current interleaver technology is entirely satisfactory in many applications, some classes of interleavers are physically large while others may be complex to manufacture and thus have high costs. Accordingly, it would be very desirable to reduce size and costs while increasing the feature set and functionalities provided in today's optical networking infrastructure.

SUMMARY OF THE INVENTION

An inventive method and apparatus is provided by a bidirectional optical 1×2 device formed by a cascade of three optical 2×2 devices. The first of two distal end ports of a first 2×2 device in the first tier of the cascade is optically coupled via a first bidirectional optical path to a proximal end port of a second 2×2 device (one of two 2×2 devices in the second tier of the cascade). The second distal end port of the first 2×2 device is optically coupled via a second bidirectional optical path to a proximal end port FL of the third 2×2 device (the other of the two 2×2 devices in the second tier of the cascade).

Each 2×2 device is bidirectional where optical signals propagate through the 2×2 device in the forward and backward directions simultaneously. An input WDM signal is received at a first proximal end port of the first 2×2 device. As the input WDM signal forward propagates through the first 2×2 device (from proximal end to distal end), it is demultiplexed into first and second subsets of optical channels. In some applications of the invention, the channel spacing in each of the first and second subsets may be approximately double that of the input WDM signal.

Third and fourth subsets of optical channels are received, respectively, at a distal end port of the second 2×2 device and a distal end port of the third 2×2 device. As the third and fourth subsets of optical channels backward propagate through the first 2×2 device (from distal end to proximal end), they are multiplexed into an output WDM signal that is output at the second proximal end port of the first 2×2 device. In some applications of the invention, the output WDM signal may have a channel spacing that is approximately half that of the third and fourth subsets. The demultiplexing in the forward direction and multiplexing in the backward direction occur simultaneously to thereby perform bidirectional 1×2 optical demultiplexing and 2×1 optical multiplexing in the 1×2 device.

In illustrative embodiments of the invention, a bidirectional 1×4 demultiplexer, 4×1 multiplexer is disclosed for demultiplexing an input WDM signal propagating in the forward direction into four discrete output channels while simultaneously multiplexing four discrete input channels propagating in the backward direction into an output WDM signal. The bidirectional 1×4 demultiplexer, 4×1 multiplexer is arranged from a two-tiered cascade of three 1×2 devices. The input WDM signal is received at the proximal end of the cascade and the four discrete input channels are received at the distal end. A bidirectional 1×8 demultiplexer, 8×1 multiplexer is also disclosed for demultiplexing an input WDM signal propagating in the forward direction into a eight discrete output channels while simultaneously multiplexing eight discrete input channels propagating in the backward direction into an output WDM signal. The bidirectional 1×8 demultiplexer, 8×1 multiplexer is arranged from a three-tiered cascade of seven 1×2 devices. Optical isolators are disposed at each input of the cascade in both the four and eight channel embodiments (i.e., at the proximal end input for the WDM signal and at each of the distal end inputs for the discrete input channels) to prevent feedback to the signal sources.

In another illustrative embodiment of the invention, an input WDM signal having N channels is received at a first proximal end port of a 1×2 device disposed in a first tier of a cascade of (N−1) 1×2 devices having m tiers where $2^m=N$. As the input WDM signal forward propagates through the cascade, 1×N demultiplexing thereby occurs to generate a set of N discrete output channels that are output at respective first distal end ports of the 2×2 devices in the last tier (i.e., the $m^{th}$ tier) of the cascade.

A set of N discrete input channels is received at second distal end ports of the 2×2 devices in the $m^{th}$ tier of the cascade. As the set of N input channels backward propagates through the cascaded array, N×1 optical multiplexing thereby occurs to generate an output WDM signal that is output at a second proximal end port of the 1×2 optical device in the 1$^{st}$ tier of the cascade. Optical isolators are disposed at the inputs of the cascade (i.e., at the proximal end input for the WDM signal and at each of the N distal end inputs) to prevent feedback to the signal sources.

Advantageously, the invention provides simultaneous multiplexing and demultiplexing through a single optical cascade. By functioning bidirectionally, the invention doubles the feature set while maintaining the same footprint as single function A equipment. In addition, the doubled functionality does not come at twice the cost of single function equipment as only incremental costs are incurred to implement the invention.

DETAILED DESCRIPTION

Figure 1:
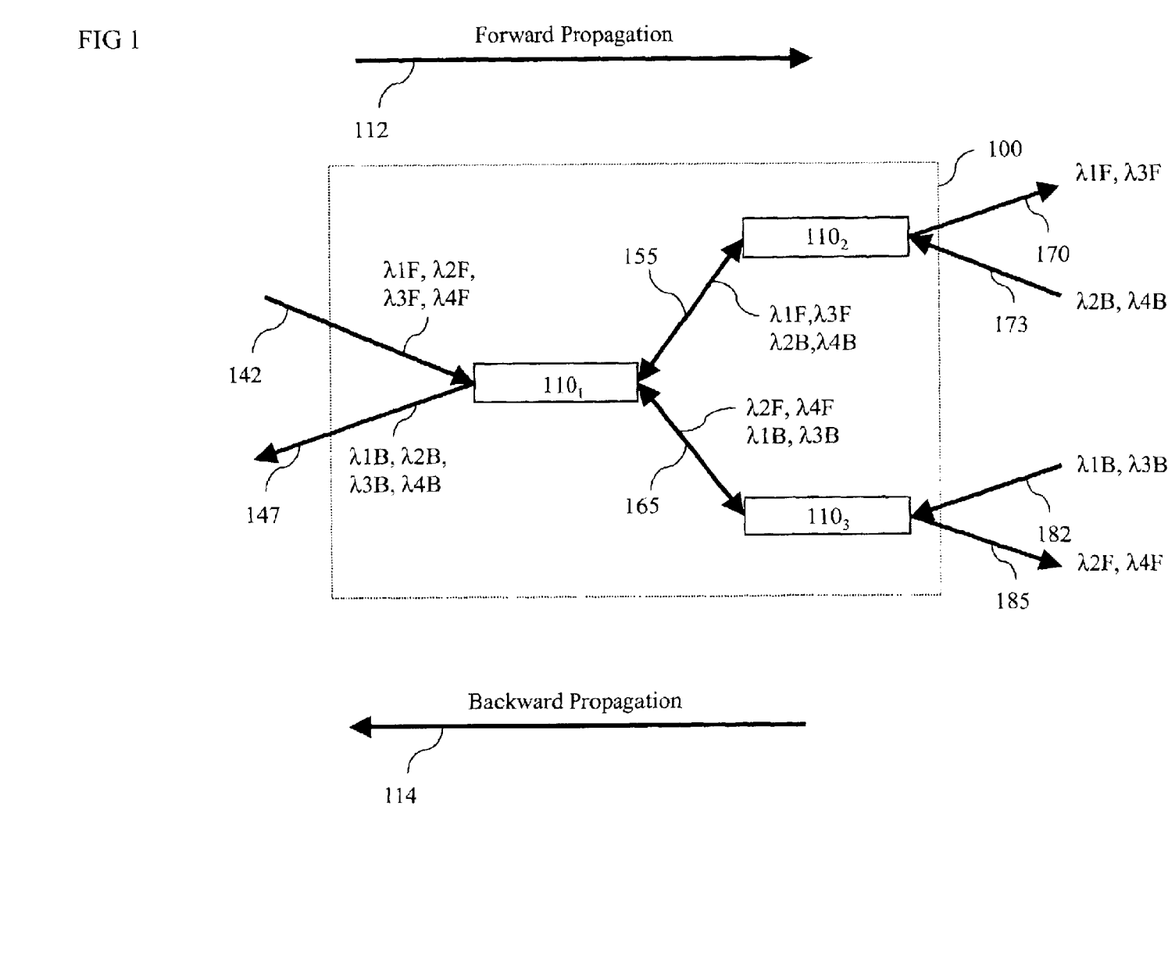
FIG. 1 depicts a bidirectional 1×2 device comprising three cascaded 2×2 devices arranged in accordance with the invention.

Referring now to FIG. 1, a bidirectional 1×2 optical device 100 is depicted. As used here, the nomenclature "1×2" is used to indicate that an input signal is demultiplexed into two signals in the forward direction, and two input signals are multiplexed into a single output signal in the backward direction. As indicated in FIG. 1, the forward direction of signal propagation is oriented from left to right on the page, while the backward direction is oriented from right to left.

The bidirectional 1×2 devices is comprised of three 2×2 devices $110_1$, $110_2$, and $110_3$. As used here, "2×2" device means a device having four optical ports where two optical ports are located at the proximal end of the device, and the remaining two optical ports are located at the distal end of the device. In all the figures accompanying this description, the proximal end of a device is located on its left side, while the distal end is located on its right. Signals propagate in the forward direction in devices from proximal end to distal end, and backward propagate from distal end to proximal end. It is noted that the term "signal" is used generally to refer to an information stream propagated within an optical medium (including optical paths and devices) and may include one or more optical channels.

Each 2×2 device 110 may be selected from a variety of optical devices including couplers, narrow band couplers, Mach-Zehnder interferometers, interleavers, and Fourier filters. As shown in FIG. 1, the 2×2 devices 110 are arranged in cascade having two tiers. The 2×2 device $110_1$ is located in the first tier of the cascade and 2×2 optical devices $110_2$ and $110_3$ are located in the second tier. The 2×2 device $110_1$ in the first tier of the cascade is optically coupled to both 2×2 devices $110_2$ and $110_3$ in the second tier. As shown, bidirectional optical path 155, which may comprise an optical fiber, optically couples one of the two distal end ports of 2×2 device $110_1$ to one of the proximal end ports of 2×2 device $110_2$. Similarly, bidirectional optical path 165, which may comprise an optical fiber, optically couples the other distal end port of 2×2 device $110_1$ to one of the proximal end ports of 2×2 device $110_3$.

Unidirectional optical path 142 is coupled to one of the proximal end ports of 2×2 device $101_1$. Unidirectional optical path 147 is coupled to the other proximal end port of 2×2 device $110_1$. Unidirectional optical path 142 is configured to carry an input WDM signal as an input to the 2×2 device $110_1$ (and accordingly, to the 1×2 device 100). Unidirectional optical path 147 is configured to carry an output WDM signal as an output from the 2×2 device $110_1$ (and accordingly, from the 1×2 device 100).

At the distal ends of 2×2 devices $110_2$ and $110_3$, unidirectional optical fibers 170, 173, 182 and 185 are coupled to the four respective distal end ports, as shown in FIG. 1. Unidirectional optical fibers 170, 173, 182 and 185 may comprise optical fibers. Unidirectional optical path 170 is configured to carry an optical signal as an output from the first distal end ports of 2×2 device $110_2$. Unidirectional path 173 is configured to carry an optical signal as an input to the second distal end port of 2×2 device $110_2$. Unidirectional optical path 182 is configured to carry an optical signal as an input from the first distal end ports of 2×2 device $110_3$. Unidirectional path 185 is configured to carry an optical signal as an output from the second distal end port of 2×2 device $110_3$.

The arrangement of the optical paths 142, 147, 170, 173, 182 and 185 thus configures 1×2 device 100 so that an input WDM signal received at the proximal end of the cascade (at optical path 142) is demultiplexed (via forward propagation through the device as indicated by arrow 112 in FIG. 1) into two output signals at the distal end of the cascade (at optical paths 170 and 185). In addition, two signals input at the distal end of the cascade (at optical paths 173 and 182) are multiplexed (as indicated by the arrow 114 in FIG. 1) into a single output WDM signal that is output at the proximal end of 1×2 device 100 (at optical path 147). In accordance with the invention, 1×2 device 100 thus simultaneously operates as a 1×2 demultiplexer in the forward direction and a 2×1 multiplexer in the backward direction by using bidirectional signal propagation.

In the illustrative embodiment shown in FIG. 1, an input WDM signal having four optical channels—$\lambda 1F$, $\lambda 2F$, $\lambda 3F$, and $\lambda 4F$—is received on optical path 142 at the first proximal end port of 2×2 device $110_1$ in the first tier of the cascade. The designation "F" indicates that these optical channels forward propagate through the cascade forming the 1×2 device 100. The four channels of the input WDM signal in this embodiment is merely illustrative as other channel counts may also be utilized in the invention. For example, in the case of an eight channel input WDM signal, in the forward direction, the 1×2 device 100 demultiplexes the input WDM signal into two output signals having four channels each.

As the input WDM signal forward propagates through 2×2 device $110_1$, it is demultiplexed into first and second subsets of optical channels. The first subset of optical channels, including $\lambda 1F$ and $\lambda 3F$, is output at the first distal end port of 2×2 device $110_1$, and is carried in the forward direction by bidirectional optical path 155 to a proximal end port of 2×2 device $110_2$. The second subset, including $\lambda 2F$ and $\lambda 4F$, is output at the second distal end port of 2×2 device $110_1$, and is carried in the forward direction by bidirectional optical path 165 to a proximal end port of 2×2 device $110_3$. The first subset, including $\lambda 1F$ and $\lambda 3F$, forward propagates through 2×2 device $110_2$, and is output on the first distal end port of device $110_2$ on unidirectional optical path 170 at the distal end of the cascade, as shown in FIG. 1. Similarly, the second subset, including λ2F and λ4F, forward propagates through 2×2 device $110_3$, and is output on the second distal end port of 2×2 device $110_3$ on unidirectional optical path 185 at the distal end of the cascade.

As depicted in FIG. 1, the even-numbered channels of the input WDM signal are output on one optical path exiting the 1×2 device 100 (path 170) and the odd channels are output on another optical path exiting the 1×2 device 100 (path 185). In some applications of the invention, the channel spacing of the output signal may be arranged to be approximately twice the channel spacing of the input WDM signal. In accordance with the invention, therefore, the separation of the channels making up the input WDM signal into odd and even subsets each having increased channel spacing may be advantageously used to deinterleave the input WDM signal.

At the distal end of the 1×2 device 100, input signals are received at one of the two distal end ports of each 2×2 devices $110_2$ and $110_3$ in the second tier of the cascade. As shown in FIG. 1, a third subset of optical channels, including λ2B and λ4B, is received at the second distal end port of 2×2 device $110_2$ on unidirectional optical path 173. Similarly a fourth subset of optical channels, including λ1B and λ3B, is received at the first distal end port of 2×2 device $110_3$ on unidirectional optical path 182. The designation "B" indicates that these optical channels backward propagate through the cascade forming the 1×2 device 100.

In accordance with the invention, λ1F, λ2F, λ3F and λ4F may be substantially equal in wavelength to λ1F, λ2B, λ3B, and λ4B, respectively, and vary only in terms of direction of propagation through the 1×2 device 100. However, such substantial equality is not a requirement imposed by the invention. The two channels in each of the third and fourth subsets in this embodiment are merely illustrative as other channels counts may be utilized in the invention. For example, in the case of the third and fourth subsets having four channels each, in the backward direction, the 1×2 device 100 multiplexes the third and fourth subsets into an output WDM signal having eight channels.

The third subset of optical channels received on unidirectional optical path 173 backward propagates through 2×2 device $110_2$, is output on the proximal end port, and is carried by the bidirectional optical path 155 to the first distal end port of 2×2 device $110_1$. Similarly, the fourth subset of optical channels received on optical path 182 backward propagates through 2×2 device $110_3$, is output on the proximal end port, and is carried by the bidirectional optical path 165 to the second distal end port of 2×2 device $110_1$. In accordance with the invention, bidirectional optical path 155 is configured so that it may simultaneously carry the forward propagating optical channels λ1F and λ3F, and backward propagating channels λ2B and λ4B. Similarly, bidirectional optical path 165 is configured so that it may simultaneously carry the forward propagating optical channels λ2F and λ4F, and backward propagating channels λ1B and λ3B.

The third and fourth subsets of optical channels are multiplexed as they backward propagate through 2×2 device $110_1$. The multiplexed optical channels are output as an output WDM signal on the second proximal end port of 2×2 device $110_1$ on unidirectional optical path 147. As depicted in FIG. 1, the output WDM signal comprises λ1B, λ2B, λ3B and λ4B. In some applications of the invention, the channel spacing of the output WDM signal may be arranged to be approximately half that of the first and second subsets of optical channels. In accordance with the invention, therefore, the 1×2 device 100 shown in FIG. 1 may be advantageously used as an interleaver. Such interleaving may be performed simultaneously with the deinterleaving function described above.

Figure 2:
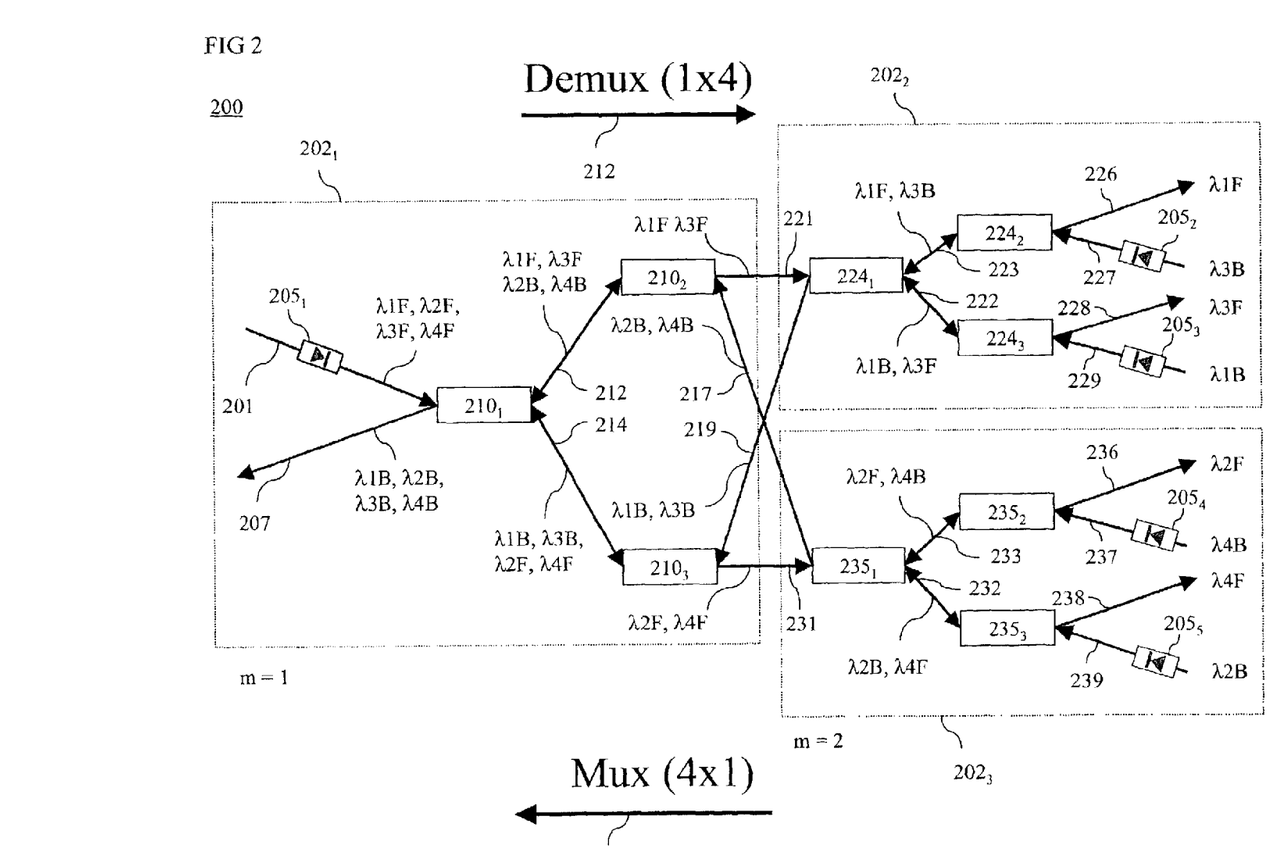
FIG. 2 depicts a bidirectional 1×4 demultiplexer, 4×1 multiplexer that is arranged from three cascaded bidirectional 1×2 devices, in accordance with the invention.

Referring now to FIG. 2, an illustrative bidirectional 1×4 demultiplexer, 4×1 multiplexer 200 is depicted that is arranged from three cascaded 1×2 devices, in accordance with the invention. The nomenclature "1×4" and "4×1" is used to indicate, respectively, the demultiplexing of an input WDM signal into four discrete output signals in the forward direction, and the multiplexing of four discrete input signals into a single output WDM signal in the backward direction.

In accordance with the invention, the bidirectional 1×4 demultiplexer, 4×1 multiplexer 200 demultiplexes an input WDM signal received at the proximal end of the cascade into four discrete optical channels at the distal end. As indicated by the arrow 212 in FIG. 2, the demultiplexing occurs as the input WDM signal forward propagates through the two tiered cascade forming the bidirectional 1×4 demultiplexer, 4×1 multiplexer 200. In addition, as indicated by the arrow 214 in FIG. 2, four discrete channels received at the distal end of the cascade are multiplexed as the channels backward propagate through the two tiered cascade forming the bidirectional 1×4 demultiplexer, 4×1 multiplexer 200. In accordance with the invention, the demultiplexing and multiplexing functions is performed simultaneously using bidirectional optical signal propagation.

The 1×2 devices, identified by reference numerals $202_{1,2,3}$ in FIG. 2, are each similar in form and operation to the 1×2 device 100 shown in FIG. 1 and described in the accompanying text. The cascade is arranged in two tiers where the first tier (designated as m=1 in FIG. 2) comprises a 1×2 device 202, that is optically coupled to both the 1×2 device $202_2$ and the 1×2 device $202_3$ that are each disposed in the second tier (designated as m=2 in FIG. 2).

As shown in FIG. 2, 2×2 device $210_2$ in 1×2 device $202_1$ is coupled at the first distal end port via unidirectional optical path 221 to a first proximal end port of 2×2 device $224_1$ in 1×2 device $202_2$. The second proximal end port of 2×2 device $224_1$ is coupled via unidirectional optical path 219 to the first distal end port of 2×2 device $210_3$ in 1×2 device 2021. The second distal end port of 2×2 device 2103 is coupled via unidirectional optical path 231 to the second proximal end port of 2×2 device $235_1$ in 1×2 device $202_3$. The first proximal end port of 2×2 device $235_1$ is coupled via unidirectional optical path 217 to the second distal end port of 2×2 device $210_2$ in 1×2 device $202_1$. Optical paths 221, 219, 231, and 217 may comprise optical fibers.

In the illustrative embodiment shown in FIG. 2, an input WDM signal having four optical channels—λ1F, λ2F, λ3F, and λ4F—is received on unidirectional optical path 201 at the first proximal end port of 2×2 device $210_1$ in the 1×2 device $202^1$ in the first tier of the cascade. An optical isolator 205, is disposed along the optical path 201 to prevent feedback to the WDM signal source (not shown in FIG. 2).

As the input WDM signal forward propagates through 2×2 device $210_1$, it is demultiplexed into first and second subsets of optical channels. The first subset of optical channels, λ1F and λ3F, is carried in the forward direction by bidirectional optical path 212. The second subset, including λ2F and λ4F, is carried in the forward direction by bidirectional optical path 214. The first subset, including λ1F and λ3F, forward propagates through 2×2 device $210_2$, and is output on the first distal end port of device $210_2$ on unidirectional optical path 221 in the forward direction to the first proximal end port of 2×2 device $224_1$ in the 1×2 device $202_2$. Similarly, the second subset, including λ2F and λ4F, forward propagates through 2×2 device $210_3$, and is output on the first distal end port of 2×2 device $210_3$ on unidirectional optical path 231 in the forward direction to the second proximal end port of 2×2 device $235_1$ in 1×2 device $202_3$. In accordance with the invention, the even-numbered channels of the input WDM signal are output on unidirectional optical path 231 and the odd channels are output on unidirectional optical path 221. In some applications of the invention, the channel spacing of the signals output on unidirectional optical paths 231 and 221 may be arranged to be approximately twice the channel spacing of the input WDM signal received on unidirectional optical path 201.

The first subset of optical channels, including λ1F and λ3F, forward propagates through 2×2 device $224_1$ where it is demultiplexed so that a single optical channel λ1F is carried in the forward direction by bidirectional optical path 223 to a proximal end port of 2×2 device $224_2$, and a single optical channel λ3F is carried in the forward direction by bidirectional optical path 222 to a proximal end port of 2×2 device $224_3$. The optical channel λ1F forward propagates through 2×2 device $224_2$ and is output on the first distal end port to unidirectional optical path 226. The optical channel λ3F forward propagates through 2×2 device $224_3$ and is output at the first distal end port to unidirectional optical path 228.

The second subset of optical channels, including λ2F and λ4F, forward propagates through 2×2 device $235_1$ where it is demultiplexed so that a single optical channel λ2F is carried in the forward direction by bidirectional optical path 233 to a proximal end port of 2×2 device $235_2$ and a single optical channel λ4F is carried in the forward direction by bidirectional optical path 232 to a proximal end port of 2×2 device $235_3$. The optical channel λ2F forward propagates through 2×2 device $235_2$ and is output on the first distal end port on unidirectional optical path 236. The optical channel λ4F forward propagates through 2×2 device $235_3$ and is output at the first distal end port on unidirectional optical path 238.

Therefore in the forward direction, in accordance with the invention, as the input WDM signal having four channels (λ1F, λ2F, λ3F, and λ4F) forward propagates through the bidirectional 1×4 demultiplexer, 4×1 multiplexer 200, it is demultiplexed and the four optical channels emerge as discrete channels on respective optical paths 226, 228, 236, and 238 at the distal end. In the first tier of the cascade (i.e., 1×2 device $202_1$), the input WDM signal is demultiplexed into separate odd and even optical channel subsets. In this illustrative example, each subset contains two optical channels. The odd and even optical channels subsets are demultiplexed in respective 1×2 devices in the second tier of the cascade to further demultiplex each optical channel subset by half again and output each subset half at the distal end of the second tier. Of course in this illustrative example, by splitting each subset of two members in half, the second tier operates to create discrete optical output channels. In some applications of the invention, the channel spacing may thus be approximately doubled as the input WDM signal is demultiplexed as it forward propagates from the first tier to the second tier in the cascade forming the bidirectional 1×4 demultiplexer, 4×1 multiplexer 200.

In the illustrative embodiment shown in FIG. 2, four discrete optical channels—λ3B, λ1B, λ4B, and λ2B—are received on respective unidirectional optical paths 227, 229, 237 and 239 at respective second distal end ports of 2×2 devices $224_2$, $224_3$, $235_2$ and $225_3$. Optical isolators $205_2$, $205_3$, $205_4$ and $205_5$ are disposed along the optical paths, as shown, to prevent feedback to the optical channel sources (not shown in FIG. 2). In accordance with the invention, λ1F, λ2F, λ3F and λ4F may be substantially equal in wavelength to λ1B, λ2B, λ3B, and λ4B, respectively, and vary only in terms of direction of propagation through the bidirectional 1×4 demultiplexer, 4×1 multiplexer 200. However, such substantial equality is not a requirement imposed by the invention.

At 1×2 device $202_2$, λ3B and λ1B are received at respective second distal end ports of 2×2 device $224_2$ and $224_3$. λ3B backward propagates through 2×2 device $224_2$, is output on a proximal end port of device $224_2$, and is carried by optical path 223 in the backward direction to the first distal end port of 2×2 device $224_1$. Similarly, optical channel λ1B backward propagates through 2×2 device $224_3$, is output on a proximal end port of 2×2 device $224_3$, and is carried by optical path 222 in the backward direction to the second distal end port of 2×2 device $224_1$. As they backward propagate, 2×2 device $224_1$ multiplexes λ3B and λ1B into a third subset of optical channels that is output on the second proximal end port of 2×2 device $224_1$ and carried by optical path 219 in the backward direction to the first distal end port of 2×2 device $210_3$ in the 1×2 optical device $202_1$.

At 1×2 device $202_3$, λ4B and λ2B are received at respective second distal end ports of 2×2 device $225_2$ and $225_3$. λ4B backward propagates through 2×2 device $225_2$, is output on a proximal end port of device $235_2$, and is carried by optical path 217 in the backward direction to the first distal end port of 2×2 device $235_1$. Similarly, optical channel λ2B backward propagates through 2×2 device $235_3$, is output on a proximal end port of 2×2 device $235_3$, and is carried by optical path 232 in the backward direction to the second distal end port of 2×2 device $235_1$. As they backward propagate, 2×2 device $235_1$ multiplexes λ2B and λBB into a fourth subset of optical signals that is output on the first proximal end port of 2×2 device $225_1$ and carried by optical path 217 in the backward direction to the second distal end port of 2×2 device $210_2$ in the 1×2 optical device $202_1$.

At 1×2 device $202_1$, the fourth subset, including λ2B and λ4B, received at the second distal end port of 2×2 device $210_2$ backward propagates through 2×2 device $210_2$. The fourth subset, including λ2B and λ4B, is output on a proximal end port of device $210_2$, and is carried by optical path 212 in the backward direction to the first distal end port of 2×2 device $210_1$. Similarly, the third subset, including λ1B and λ3B, received at the first distal end port of 2×2 device $210_3$ backward propagates through 2×2 device $210_3$. The third subset, including λ1B and λ3B, is output on a proximal end port of device $210_3$, and is carried by optical path 214 in the backward direction to the second distal end port of 2×2 device $210_1$. The 2×2 device $235_1$ multiplexes the third and fourth subsets into an output WDM signal that is output on the second proximal end port of 2×2 device $225_1$ on optical path 207 in the backward direction. The output WDM signal has four channels—λ1B, λ2B, λ2B and λ4B—as shown in FIG. 2.

Therefore in the backward direction, in accordance with the invention, an output WDM signal is multiplexed from four optical channels (λ1B, λ2B, λ3B, and λ4B that are received a the distal end of the second tier as discrete optical channels on respective unidirectional optical paths 227, 229, 237, and 239) as the optical channels backward propagate through the bidirectional 1×4 demultiplexer, 4×1 multiplexer 200. In the second tier of the cascade (i.e., 1×2 devices $202_{2,3}$), the received optical channels are multiplexed into separate odd and even optical channel subsets in the respective 1×2 devices $202_2$ and $202_3$. In this illustrative example, each subset contains two optical channels. Thus, the second tier of the cascade operates in the backward direction to output, at the proximal end of the second tier, a pair of optical subsets each having double the channel count of each of the discrete input signals received at the distal end of the cascade's second tier. The odd and even optical channels subsets are each multiplexed in the 1×2 device $202_1$ in the first tier of the cascade to double channel count again and generate the output WDM signal that is output at the proximal end of the cascade's first tier on optical path 207. In some applications of the invention, the channel spacing may thus be approximately halved (i.e., the optical channels are closer together) as the optical subsets backward propagate from the second tier to the first tier of the cascade forming the bidirectional 1×4 demultiplexer, 4×1 multiplexer 200.

Figure 3:
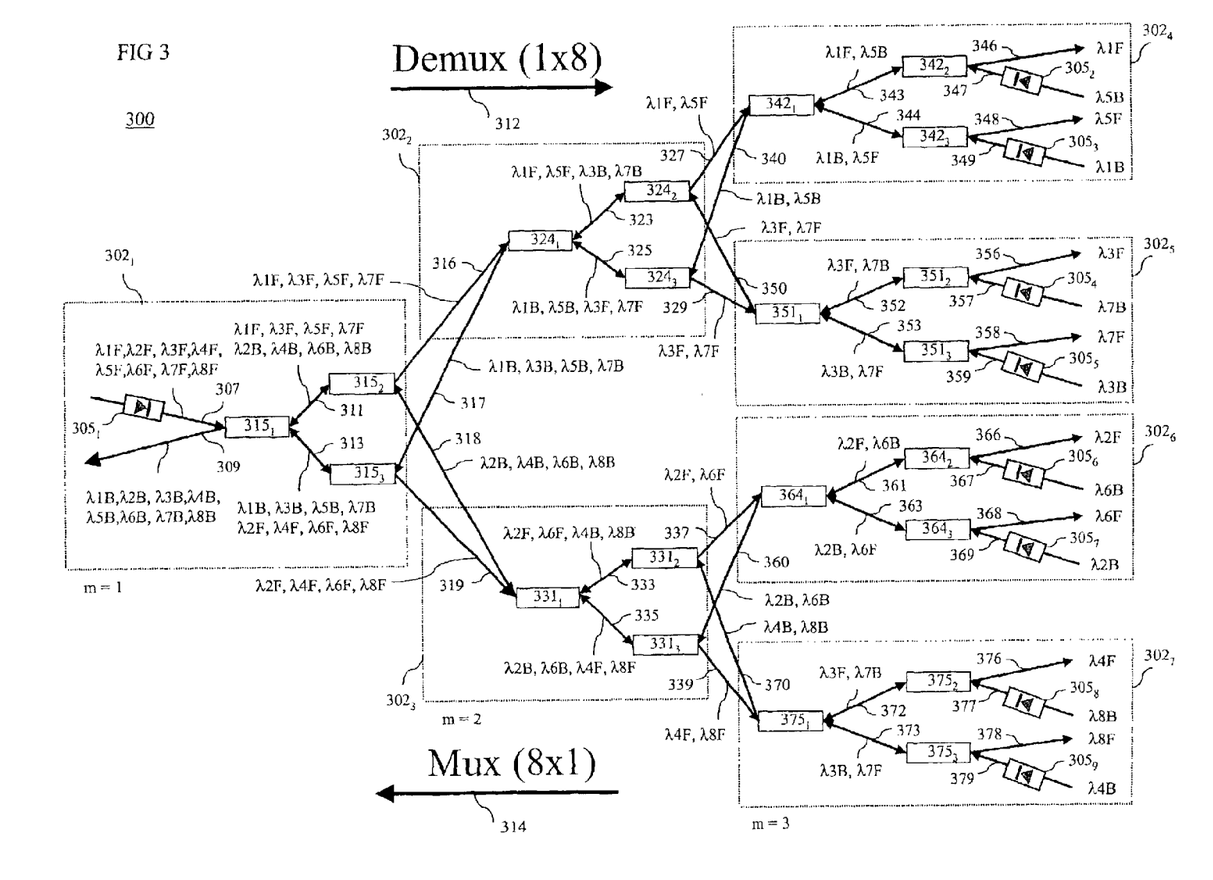
FIG. 3 depicts a bidirectional 1×8 demultiplexer, 8×1 multiplexer that is arranged from a plurality of cascaded bidirectional 1×2 devices, in accordance with the invention.

Referring now to FIG. 3, an illustrative bidirectional 1×8 demultiplexer, 8×1 multiplexer 300 is depicted that is arranged from seven cascaded 1×2 devices, in accordance with the invention. The nomenclature "1×8" and "8×1" is used to indicate, respectively, the demultiplexing of an input WDM signal into eight discrete signals in the forward direction, and the multiplexing of eight discrete signals into a single output WDM signal in the backward direction.

In accordance with the invention, the bidirectional 1×8 demultiplexer, 8×1 rat multiplexer 300 demultiplexes an input WDM signal received at the proximal end of the cascade into eight discrete optical channels at the distal end. As indicated by the arrow 312, the demultiplexing occurs as the input WDM signal forward propagates through the three tiered cascade forming the bidirectional 1×8 demultiplexer, 8×1 multiplexer 300. In addition, as indicated by the arrow 314, eight discrete channels received at the distal end of the cascade are multiplexed as the channels backward propagate through the three tiered cascade forming the bidirectional 1×8 demultiplexer, 8×1 multiplexer 300. In accordance with the invention, the demultiplexing and multiplexing functions is performed simultaneously using bidirectional optical signal propagation.

The 1×2 devices, identified by reference numerals $302_{1-7}$ in FIG. 3, are each similar in form and operation to the 1×2 device 100 shown in FIG. 1 and described in the accompanying text. The cascade forming the bidirectional 1×8 demultiplexer, 8×1 multiplexer 300 is arranged in three tiers where the first tier (designated as m=1 in FIG. 3) comprises a 1×2 device $302_1$ that is optically coupled to both the 1×2 device $302_2$ and the 1×2 device $302_3$ that are each disposed in the second tier (designated as m=2 in FIG. 3). The 1×2 device $302_2$ in the second tier of the cascade is optically coupled to both the 1×2 device $302_4$ and the 1×2 device $302_5$ that are each disposed in the third tier (designated as m=3 in FIG. 3). The 1×2 device $302_3$ in the second tier of the cascade is optically coupled to both the 1×2 device $302_6$ and the 1×2 device $302_7$ that are each disposed in the third tier.

The structure of bidirectional 1×8 demultiplexer, 8×1 multiplexer 300 is similar in form to bidirectional 1×4 demultiplexer, 4×1 multiplexer 200 shown in FIG. 2 and described in the accompanying text. However, in order to provide the additional multiplexing and demultiplexing function for the additional optical channels, a third tier of 1×2 devices is added. It may also be recognized that the 1×8, 8×1 structure may be considered as a bidirectional 1×4 demultiplexer, 4×1 demultiplexer (formed from 1×2 devices $302_1$, $302_2$ and $302_3$) that is coupled to the four 1×2 devices $302_4$, $302_5$, $302_6$ and $302_7$. Alternatively, the 1×8, 8×1 structure may be considered as two 1×4 demultiplexer, 4×1 demultiplexers (the first being forming 1×2 devices $302_2$, $302_4$ and $302_5$ and the second being formed from 1×2 devices $302_3$, $302_6$ and $302_7$) that are both coupled to the single 1×2 device 302, and operated in parallel.

The signal flow through the arrangement shown in FIG. 3 is similar to that shown in FIG. 2 with the fundamental difference being that eight channels propagate in each direction rather than the four in the previous illustrative example. Accordingly, an input WDM signal having eight optical channels—λ1F to λ8F—is received on the unidirectional optical path 307 at the first proximal end port of 2×2 device 315, in the 1×2 device 302, in the first tier of the cascade. An optical isolator $305_1$ is disposed along the optical path 307 to prevent feedback to the WDM signal source (not shown in FIG. 3).

As the input WDM signal forward propagates through 2×2 device $315_1$, it is demultiplexed into a first subset of four optical channels, λ1F, λ3F, λ5F and λ7F, and a second subset of the other four optical channels, λ2F, λ4F, λ6F and λ8F. The first subset is carried in the forward direction by bidirectional optical path 311 to a proximal end port of 2×2 device $315_2$. The second subset is carried in the forward direction by bidirectional optical path 313 to a proximal end port of 2×2 device $315_3$.

The first subset of optical channels, including λ1F, λ3F, λ5F and λ7F, forward propagates through 2×2 device $315_2$, is output on the first distal end port of device $315_2$, and is carried by optical path 316 in the forward direction to the first proximal end port of 2×2 device $324_1$ in the 1×2 device $302_2$. Similarly, the second subset of optical channels, including λ2F, λ4F, λ6F and λ8F, forward propagates through 2×2 device $315_3$, is output on the second distal end port of 2×2 device $315_3$, and is carried by optical path 319 in the forward direction to the second proximal end port of 2×2 device $331_1$ in 1×2 device $302_3$. Thus, the even-numbered channels of the input WDM signal are output on optical path 319 and the odd channels are output on optical path 316. In some applications of the invention, the channel spacing of the signals output on paths 319 and 316 may be arranged to be approximately twice the channel spacing of the input WDM signal received on unidirectional optical path 307.

As indicated in FIG. 3, as the first subset of optical channels, including λ1F, λ3F, λ5F and λ7F, forward propagates through 2×2 device $324_1$, it is demultiplexed into a third subset of optical channels, including λ1F and λ5F, and a fourth subset of optical channels, including λ3F and λ7F. The third subset of optical channels, including λ1F and λ5F, is carried in the forward direction by bidirectional optical path 323, forward propagates through 2×2 device $324_2$ and is output from the first distal end port to the first proximal end port of 2×2 device $342_1$ in 1×2 device $302_4$ via unidirectional optical path 327. The fourth subset of optical channels, including λ3F and λ7F, is carried in the forward direction by bidirectional optical path 325, forward propagates through 2×2 device $324_3$ and is output at the first distal end port to the second proximal end port of 2×2 device $351_1$ in 1×2 device $302_5$ via unidirectional optical path 329.

The third subset of optical channels, including λ1F and λ5F, forward propagates through 2×2 device $324_1$, where it is demultiplexed so that a single optical channel λ1F is carried in the forward direction by bidirectional optical path 343 to a proximal end port of 2×2 device $342_2$ and a single optical channel λ5F is carried in the forward direction by bidirectional optical path 344 to a proximal end port of 2×2 device $342_3$. The optical channel λ1F forward propagates through 2×2 device $342_2$ and is output on the first distal end port on unidirectional optical path 346. The optical channel λ5F forward propagates through 2×2 device $342_3$ and is output at the first distal end port on unidirectional optical path 348.

The fourth subset of optical channels, including λ3F and λ7F, forward propagates through 2×2 device $351_1$ where it is demultiplexed so that a single optical channel λ3F is carried in the forward direction by bidirectional optical path 352 to a proximal end port of 2×2 device $351_2$ and a single optical channel λ7F is carried in the forward direction by bidirectional optical path 353 to a proximal end port of 2×2 device $351_3$. The optical channel λ3F forward propagates through 2×2 device $351_2$ and is output on the first distal end port on unidirectional optical path 356. The optical channel λ7F forward propagates through 2×2 device $351_3$ and is output at the first distal end port on unidirectional optical path 358.

As indicated in FIG. 3, as the second subset of optical channels, including λ2F, λ4F, λ6F and λ8F, forward propagates through 2×2 device $331_1$, it is demultiplexed into a fifth subset of optical channels, including λ2F and λ6F, and a sixth subset of optical channels, including λ4F and λ8F. The fifth subset of optical channels, including λ2F and λ6F, is carried in the forward direction by bidirectional optical path 333 to a proximal end port of 2×2 device $331_2$, forward propagates through 2×2 device $331_2$ and is output from the first distal end port to the first proximal end port of 2×2 device $364_1$ in 1×2 device $302_6$ via unidirectional optical path 337. The sixth subset of optical channels including λ4F and λ8F is carried in the forward direction by bidirectional optical path 335 to a proximal end port of 2×2 device $331_3$, forward propagates through 2×2 device $331_3$ and is output at the second distal end port to the second proximal end port of 2×2 device $375_1$ via unidirectional optical path 339.

The fifth subset of optical channels, including λ2F and λ6F, forward propagates through 2×2 device $364_1$ where it is demultiplexed so that a single optical channel λ2F is carried in the forward direction by bidirectional optical path 361 to a proximal end port of 2×2 device $364_2$ and a single optical channel λ6F is carried in the forward direction by bidirectional optical path 363 to a proximal end port of 2×2 device $364_3$. The optical channel λ2F forward propagates through 2×2 device $364_2$ and is output on the first distal end port on unidirectional optical path 366. The optical channel λ6F forward propagates through 2×2 device $364_3$ and is output at the first distal end port on unidirectional optical path 368.

The sixth subset of optical channels, including λ4F and λ8F, forward propagates through 2×2 device $375_1$ where it is demultiplexed so that a single optical channel λ4F is carried in the forward direction by bidirectional optical path 372 to a proximal end port of 2×2 device $375_2$ and a single optical channel λ8F is carried in the forward direction by bidirectional optical path 373 to a proximal end port of 2×2 device $375_3$. The optical channel λ4F forward propagates through 2×2 device $375_2$ and is output on the first distal end port on unidirectional optical path 376. The optical channel λ8F forward propagates through 2×2 device $375_3$ and is output at the first distal end port on unidirectional optical path 378.

Therefore in the forward direction, in accordance with the invention, as the input WDM signal having eight channels (λ1F through λ8F) forward propagates through the bidirectional 1×8 demultiplexer, 8×1 multiplexer 300, it is demultiplexed and the eight optical channels emerge as discrete channels on respective optical paths 346, 348, 356, 358 366, 368, 376 and 378 at the distal end. In the first tier of the cascade (i.e., 1×2 device $302_1$), the input WDM signal is demultiplexed into separate first and second subsets of optical channels including four odd and four even channels respectively. In some applications, the channel spacing in each of the first and second subsets is approximately twice that of the input WDM signal. Advantageously, the separation of the channels into odd and even subsets with increased channel spacing may be used to deinterleave the input WDM signal.

The first and second subsets of optical channels are further demultiplexed in respective 1×2 devices in the second tier of the cascade. The first subset is demultiplexed into respective third and fourth subsets of optical channels where each has half the channel count of the first subset (i.e., the third and fourth subsets each include two optical channels). The second subset is demultiplexed into respective fifth and sixth subsets of optical channels (each including two optical channels). In some applications of the invention, the channel spacing of the third and fourth subsets is approximately twice that of the first subset And, the channel spacing of the fifth and sixth subsets may be approximately twice that of the second subset. The third tier of the cascade forming 1×8 demultiplexer, 8×1 multiplexer 300 operates to demultiplex the third, fourth, fifth and sixth subsets of optical channels to reduce the channel count by half again and generate discrete optical output channels.

In the illustrative embodiment shown in FIG. 3, eight discrete optical channels—λ1B through λ8B—are received on respective unidirectional optical paths 347, 349, 357, 359, 367, 369, 377 and 379 at respective second distal end ports of 2×2 devices $342_2$, $342_3$, $351_2$, $351_3$, $364_2$, $364_3$, $375_2$ and $375_3$. Optical isolators $305_2$, $305_3$, $305_4$, $305_5$ $305_6$ $305_7$, $305_8$ and $305_9$ are disposed along the optical paths, as shown, to prevent feedback to the optical channel sources (not shown in FIG. 3). In accordance with the invention, λ1F through λ8F may be substantially equal in wavelength to λ1B through λ8B, respectively, and vary only in terms of direction of propagation through the bidirectional 1×8 demultiplexer, 8×1 multiplexer 300. However, such substantial equality is not a requirement imposed by the invention.

At 1×2 device $302_4$ in the third tier of the cascade, λ5B and λ1B are received at respective second distal end ports of 2×2 device $342_2$ and $342_3$. λ5B backward propagates through 2×2 device $342_2$, is output on a proximal end port of 2×2 device $342_2$, and is carried by bidirectional optical path 343 in the backward direction to the first distal end port of 2×2 device $342_1$. Similarly, optical channel λ1B backward propagates through 2×2 device $342_3$, is output on a proximal end port of 2×2 device $342_3$, and is carried by bidirectional optical path 344 in the backward direction to the second distal end port of 2×2 device $342_1$. As the optical channels backward propagate, 2×2 device $342_1$ multiplexes λ5B and λ1B into a seventh subset of optical channels that is output on the second proximal end port of 2×2 device $342_1$ and carried by unidirectional optical path 340 in the backward direction to the first distal end port of 2×2 device $324_3$ in the 1×2 optical device $302_1$.

At 1×2 device $302_5$ in the third tier of the cascade, λ7B and λ3B are received at respective second distal end ports of 2×2 device $351_2$ and $351_3$. λ7B backward propagates through 2×2 device $351_2$, is output on a proximal end port of device $351_2$, and is carried by bidirectional optical path 352 in the backward direction to the first distal end port of 2×2 device $351_1$. Similarly, optical channel λ3B backward propagates through 2×2 device $351_3$, is output on a proximal end port of 2×2 device $351_3$, and is carried by bidirectional optical path 353 in the backward direction to the second distal end port of 2×2 device $351_1$. As the optical channels backward propagate, 2×2 device $351_1$ multiplexes λ7B and λ3B into an eighth subset optical channels that is output on the first proximal end port of 2×2 device $351_1$ and carried by unidirectional optical path 350 in the backward direction to the second distal end port of 2×2 device $324_2$ in the 1×2 optical device $302_2$.

At 1×2 device $302_6$ in the third tier of the cascade, λ6B and λ2B are received at respective second distal end ports of 2×2 device $364_2$ and $364_3$. λ6B backward propagates through 2×2 device $364_2$, is output on a proximal end port of device $364_2$, and is carried by bidirectional optical path 361 in the backward direction to the first distal end port of 2×2 device $364_1$. Similarly, optical channel λ2B backward propagates through 2×2 device $364_3$, is output on a proximal end port of 2×2 device $364_3$, and is carried by bidirectional optical path 363 in the backward direction to the second distal end port of 2×2 device $364_1$. As the optical channels backward propagate, 2×2 device $364_1$ multiplexes λ6B and λ2B into a ninth subset of optical channels that is output on the first proximal end port of 2×2 device $364_1$ and carried by optical path 360 in the backward direction to the first distal end port of 2×2 device $331_3$ in the 1×2 optical device $302_3$.

At 1×2 device $302_7$ in the third tier of the cascade, λ8B and λ4B are received at respective second distal end ports of 2×2 device $375_2$ and $375_3$. λ8B backward propagates through 2×2 device $375_2$, is output on a proximal end port of device $375_2$, and is carried by bidirectional optical path 372 in the backward direction to the first distal end port of 2×2 device $375_1$. Similarly, optical channel λ4B backward propagates through 2×2 device $375_3$, is output on a proximal end port of 2×2 device $375_3$, and is carried by bidirectional optical path 373 in the backward direction to the second distal end port of 2×2 device $375_1$. As the optical channels backward propagate, 2×2 device $375_1$ multiplexes λ8B and λ4B into a tenth subset of optical channels that is output on the first proximal end port of 2×2 device $375_1$ and carried by optical path 370 in the backward direction to the second distal end port of 2×2 device $331_2$ in the 1×2 optical device $302_3$.

At 1×2 device $302_2$ in the second tier of the cascade, the seventh and eighth subsets of optical channels are received at respective second distal end ports of 2×2 device $324_3$ and $324_2$. The seventh subset of optical channels, including λ5B and λ1B, backward propagates through 2×2 device $324_3$, is output on a proximal end port of 2×2 device $324_3$, and is carried by bidirectional optical path 325 in the backward direction to the second distal end port of 2×2 device $324_1$. Similarly, The eighth subset of optical channels, including λ7B and λ3B, backward propagates through 2×2 device $324_2$, is output on a proximal end port of device $324_2$, and is carried by bidirectional optical path 323 in the backward direction to the first distal end port of 2×2 device $324_1$. As the seventh and eighth subsets backward propagate, 2×2 device $324_1$ multiplexes them into a eleventh subset of optical channels, including λ1B, λ3B, λ5B and λ7B, that is output on the first proximal end port of 2×2 device $324_1$ and carried by unidirectional optical path 317 in the backward direction to the first distal end port of 2×2 device $315_3$ in the 1×2 optical device $302_1$.

At 1×2 device $302_3$ in the second tier of the cascade, the ninth and tenth subsets of optical channels are received at respective second distal end ports of 2×2 device $331_3$ and $331_2$. The ninth subset of optical channels, including λ6B and λ2B, backward propagates through 2×2 device $331_3$, is output on a proximal end port of 2×2 device $331_3$ and is carried by bidirectional optical path 335 in the backward direction to the second distal end port of 2×2 device $331_1$. Similarly, The ninth subset of optical channels, including λ8B and λ4B, backward propagates through 2×2 device $331_2$, is output on a proximal end port of device $331_2$, and is carried by bidirectional optical path 333 in the backward direction to the first distal end port of 2×2 device $331_1$. As the ninth and tenth subsets backward propagate, 2×2 device $331_1$ multiplexes them into a twelfth subset of optical channels, including λ2B, λ4B, λ6B and λ8B that is output on the first proximal end port of 2×2 device $331_1$ and carried by unidirectional optical path 318 in the backward direction to the second distal end port of 2×2 device $315_2$ in the 1×2 optical device $302_1$.

At 1×2 device $302_1$ in the first tier of the cascade, the eleventh subset of optical signals received at the second distal end port of 2×2 device $315_3$ backward propagates through 2×2 device $315_3$. The eleventh subset is output on a proximal end port of device $315_3$, and is carried by bidirectional optical path 313 in the backward direction to the second distal end port of 2×2 device $315_1$. Similarly, the twelfth subset of optical signals received at the first distal end port of 2×2 device $315_2$ backward propagates through 2×2 device $315_2$. The twelfth subset is output on a proximal end port of device $315_2$, and is carried by bidirectional optical path 311 in the backward direction to the first distal end port of 2×2 device $315_1$. The 2×2 device $315_1$ multiplexes the eleventh and twelfth subsets of optical signals into an output WDM signal that is output on the second proximal end port of 2×2 device $315_1$ on optical path 309 in the backward direction. The output WDM signal has eight channels—λ1B through λ8B—as shown in FIG. 3.

Therefore in the backward direction, in accordance with the invention, an output WDM signal is multiplexed from eight optical channels λ1B through λ8B that are received at the distal end of the third tier as discrete optical channels on respective unidirectional optical paths 347, 349, 357, 359, 367, 369, 377 and 379) as the optical channels backward propagate through the bidirectional 1×8 demultiplexer, 8×1 multiplexer 300. In the third tier of the cascade (i.e., 1×2 devices $302_{4,5,6,7}$) the received optical channels are multiplexed into two odd channel subsets and two even channel subsets in the respective 1×2 devices in the third tier. In this illustrative example, each subset contains two optical channels. Thus, the third tier of the cascade operates to output, at the proximal end of the third tier, four subsets of optical channels each having double the channel count of the discrete input signals received at the third tier's distal end. In the second tier of the cascade (i.e., 1×2 devices $302_{2,3}$), the received subsets of optical channels are multiplexed into one odd channel and one even channel subset in the respective 1×2 devices $302_2$ and $302_3$. In this illustrative example, each subset generated by the second tier contains four optical channels. Thus, the second tier of the cascade operates to output, at the proximal end of the second tier, a pair of optical subsets each having double the channel count of the input subsets received at the distal end of the cascade's second tier. The odd and even optical channels subsets are each multiplexed in the 1×2 device $302_1$ in the first tier of the cascade to double channel count again and generate the output WDM signal that is output at the proximal end of the cascade's first tier on optical path 309. In some applications of the invention, the channel spacing may thus be halved as the optical subsets backward propagate from the third tier to the second tier to the first tier of the cascade forming the bidirectional 1×8 demultiplexer, 8×1 multiplexer 300.

It will be appreciated that the inventive arrangement may be generalized for applicability to any desired optical channel count. That is, a bidirectional 1×N demultiplexer, N×1 multiplexer (where N is the optical channel count) may be implemented, in accordance with the invention, by a cascade of (N−1) 1×2 devices having m tiers where $2^m = N$. The 1×2 devices may each be similar to that shown in FIG. 1 and described in the accompanying text.

Each successive tier includes twice as many 1×2 devices as in the preceding tier. That is, the first tier includes one 1×2 device, the second tier includes two 1×2 devices and the $m^{th}$ tier includes $2^{(m-1)}$ 1×2 devices. Therefore, for example, to create an N=16 bidirectional multiplexer, demultiplexer, 15 1×2 devices are used in a four-tiered configuration. The first tier includes one 1×2 device, the second tier includes two 1×2 devices, the third tier includes four 1×2 devices, and the fourth tier includes eight 1×2 devices. Likewise, an N=32 bidirectional multiplexer, demultiplexer would include 31 1×2 devices arranged in a five-tiered cascade.

Each 1×2 device in a tier is optically coupled to two 1×2 devices in the successive tier. In the forward direction, an input optical signal received at the proximal end of each 1×2 device is multiplexed into two separate output subsets of optical signals at the distal end of the 1×2 device. One of the output subsets becomes an input signal to one of the coupled 1×2 devices in the successive tier, and the other output subset becomes an input signal to the other coupled 1×2 device in the successive tier. Thus, in the forward direction, at each $m^{th}$ tier of the cascade, $2^{(m-1)}$ subsets of optical channels are received at the proximal end of the tier, and $2^m$ subsets of optical channels are output at the distal end of the tier. In applications of the invention, as the optical signals propagates from tier to tier in the forward direction the channel spacing in each output subset approximately doubles until the last tier at the distal end of the cascade is reached where N optical subsets are output where each subset includes a single optical channel.

In the backward direction, two separate input subsets of optical signals are received at the distal end of each 1×2 device in each given tier of the cascade. Each 1×2 device multiplexes the two input subsets into a single output subset. The output subset becomes an input subset to the first one of the distal end ports of a 1×2 device in a preceding tier. A second 1×2 device in the given tier provides the input subset to the second distal end port of the 1×2 device in the preceding tier. Thus, in the backward direction, at each $m^{th}$ tier of the cascade, $2^m$ subsets of optical channels are received at the distal end of the tier, and $2^{(m-1)}$ subsets of multiplexed optical channels are output at the proximal end of the tier. In applications of the invention, as the signal propagates from tier to tier in the backward direction, the channel spacing in each output subset is approximately halved until the first tier at the proximal end of the cascade is reached where a single output WDM signal is output from the bidirectional 1×N demultiplexer, N×1 multiplexer.

Other embodiments of the invention may be implemented in accordance with the claim that follow.

What is claimed is:

1. A method of operating an optical device bidirectionally, the optical device arranged from first through third 2×2 devices each having a proximal end and a distal end, wherein signals forward propagate from proximal end to distal end, and backward propagate from distal end to proximal end, and wherein the second 2×2 device is coupled to a first distal end port of the first 2×2 device and the third 2×2 device is coupled to a second distal end port of the first 2×2 device to form a cascaded arrangement from the three 2×2 devices, the method comprising the steps of:

receiving an input WDM signal at a first proximal end port of the first 2×2 device;

forward propagating the input WDM signal through the first 2×2 device so as to demultiplex the input WDM signal into first and second subsets of optical signals;

receiving a third subset of optical channels at a first distal end port of the second 2×2 device;

receiving a fourth subset of optical channels at a first distal end port of the third 2×2 device; and, backward propagating the first and second subsets of optical signals through the first 2×2 device so as to multiplex the first and second subsets of optical signals into an output WDM signal, wherein the steps of demultiplexing and multiplexing occur simultaneously to thereby perform bidirectional 1×2 optical demultiplexing and 2×1 optical demultiplexing.

2. The method of claim 1 including the step of outputting the first subset of optical signals from a second distal end port of the second 2×2 device.

3. The method of claim 1 including the step of outputting the second subset of optical signals from a second distal end port of the third 2×2 device.

4. The method of claim 1 including the step of outputting the output WDM signal from a second proximal end port of the first 2×2 device.

5. The method of claim 1 wherein the optical device comprises a planar lightguide circuit.

6. The method of claim 1 wherein the optical device comprises a fiber-based device.

7. A method of operating an optical device bidirectionally, the optical device arranged from first through third 2×2 devices each having a proximal end and a distal end, where signals forward propagate from proximal end to distal end, and backward propagate from distal end to proximal end, wherein the second 2×2 device is coupled to a first distal end port of the first 2×2 device and the third 2×2 device is coupled to a second distal end port of the first 2×2 device to form a cascaded arrangement from the three 2×2 devices, the method comprising the steps of: receiving an input WDM signal at a first proximal end port of the first 2×2 device;

receiving a first subset of optical channels at a first distal end port of the second 2×2 device;

receiving a second subset of optical channels at a first distal end port of the third 2×2 device;

dividing the input WDM signal into third subset and fourth subsets of optical signals while the input WDM signal forward propagates through the first 2×2 device; and combining the third and fourth subsets of optical signals into an output WDM signal while the third and fourth subsets of optical signals backward propagate through the first 2×2 device.

8. The method of claim 7 wherein (N−1) optical devices are arranged in a cascaded array and operated to simultaneously divide N optical channels constituting the input WDM signal and combine N optical channels constituting the first and second subsets of optical channels.

9. A method of operating a cascaded array of (N−1) bidirectional 1×2 devices, each 1×2 device arranged from first through third 2×2 devices each having a proximal end and a distal end, where signals forward propagate from proximal end to distal end, and backward propagate from distal end to proximal end, wherein the second 2×2 device is coupled to a first distal end port of the first 2×2 device and the third 2×2 device is coupled to a second distal end port of the first 2×2 device to form a cascaded arrangement from the three 2×2 devices, the method comprising the steps of:

receiving N discrete optical signals, each optical signal having a discrete wavelength, at N distal end ports of 1×2 devices located at a distal end of the cascaded array;

receiving a WDM input signal having N optical channels at a proximal end port of a 1×2 device located at the proximal end of the cascaded array;

forward propagating the input WDM signal through the cascaded array of 1×2 devices so as to divide the input WDM signal into N subsets of optical signals; and backward propagating the N discrete optical signals so as to combine the N discrete optical signals into an output WDM signal, wherein the steps of dividing and combining occur simultaneously to thereby perform bidirectional 1×N optical dividing and N×1 optical combining.

10. The method of claim 9 wherein each subset within the N subsets of optical signals comprises a single optical channel having an associated wavelength.

11. The method of claim 10 including the step of outputting each single optical channel of the N subsets of optical signals to respective N distal end ports of 1×2 devices located at a distal end of the cascaded array.

12. The method of claim 9 including the step of outputting the output WDM signal from a second proximal end port of the first 1×2 device.

13. A bidirectional 1×2 optical demultiplexer and 2×1 optical multiplexer arranged from a plurality of 2×2 devices each having a proximal end and a distal end, where signals forward propagate from proximal end to distal end, and backward propagate from distal end to proximal end, for simultaneously demultiplexing a first WDM signal into a first set of optical signals and multiplexing a second WDM signal from a second set of optical signals, comprising:

a first 2×2 optical device;

a second 2×2 optical device;

a third 2×2 optical device;

a first bidirectional optical transmission line coupling a first distal end port of the first 2×2 device to the second 2×2 device; and a second bidirectional optical transmission line coupling a second distal end port of the first 2×2 device to the third 2×2 device to thereby arrange a cascaded stage from the second and third 2×2 devices;

wherein the first 2×2 optical device is arranged to operate so as to simultaneously demultiplex the first WDM optical signal into the first set of optical signals while forward propagating the first WDM signal through the first 2×2 device, and multiplex the second set of optical signals into the second WDM optical signal while backward propagating the second set of optical signals in the first 2×2 device.

14. The bidirectional 1×2 optical demultiplexer and 2×1 optical multiplexer of claim 13 further including an first output port disposed on the distal end of the second 2×2 device for outputting a first subset of the first set of optical signals.

15. The bidirectional 1×2 optical demultiplexer and 2×1 optical multiplexer of claim 14 wherein the first subset of the first set of optical signals consists of odd channels.

16. The bidirectional 1×2 optical demultiplexer and 2×1 optical multiplexer of claim 13 further including an output port disposed on the distal end of the third 2×2 device for outputting a second subset of the first set of optical signals.

17. The bidirectional 1×2 optical demultiplexer and 2×1 optical multiplexer of claim 16 wherein the second subset of the first set of optical signals consists of even channels.

18. The bidirectional 1×2 optical demultiplexer and 2×1 optical multiplexer of claim 13 further including an input port disposed on the distal end of the second 2×2 device for receiving a first subset of the second set of optical signals.

19. The bidirectional 1×2 optical demultiplexer and 2×1 optical multiplexer of claim 18 wherein the first subset of the second set of optical signals consists of odd channels.

20. The bidirectional 1×2 optical demultiplexer and 2×1 optical multiplexer of claim 13 further including an input port disposed on the distal end of the second 2×2 device for receiving a second subset of the second set of optical signals.

21. The bidirectional 1×2 optical demultiplexer and 2×1 optical multiplexer of claim 20 wherein the second subset of the second set of optical signals consists of even channels.

22. A combined N×1 optical multiplexer and 1×N optical demultiplexer, comprising:

(N−1) bidirectional 1×2 optical demultiplexer 2×1 optical multiplexers arranged in a multi-tiered cascaded arrangement having m tiers where $2^m=N$, and where each bidirectional 1×2 optical demultiplexer and 2×1 optical multiplexer is arranged from a plurality of 2×2 devices each having a proximal end and a distal end, where signals forward propagate from proximal end to distal end, and backward propagate from distal end to proximal end, for simultaneously demultiplexing a first WDM signal into a first set of optical signals and multiplexing a second WDM signal from a second set of optical signals, each bidirectional 1×2 comprising a first 2×2 optical device;

a second 2×2 optical device;

a third 2×2 optical device;

a first bidirectional optical transmission line coupling a first distal end port of the first 2×2 device to the second 2×2 device; and a second bidirectional optical transmission line coupling a second distal end port of the first 2×2 device to the third 2×2 device to thereby arrange a cascaded stage from the second and third 2×2 devices;

wherein the multi-tiered cascaded array is operated to forward propagating the input WDM signal through the multi-tiered cascaded array so as to divide the input WDM signal into N subsets of optical signals and backward propagating the N discrete optical signals so as to combine the N discrete optical signals into an output WDM signal wherein the steps of dividing and combining occur simultaneously to thereby perform bidirectional 1×N optical demultiplexing and N×1 optical multiplexing.

23. The combined N×1 optical multiplexer and 1×N optical demultiplexer of claim 22, wherein one or more of the 2×2 devices is an interleaver.

24. The combined N×1 optical multiplexer and 1×N optical demultiplexer of claim 22, wherein one or more of the 2×2 devices is a coupler.

25. The combined N×1 optical multiplexer and 1×N optical demultiplexer of claim 22, wherein one or more of the 2×2 devices is a Mach-Zehnder interferometer.

26. The combined N×1 optical multiplexer and 1×N optical demultiplexer of claim 22, wherein one or more of the 2×2 devices is an Fourier filter.

27. The combined N×1 optical multiplexer and 1×N optical demultiplexer of claim 22, wherein each 2×2 device includes two distal end ports and an optical isolator is disposed at one of the distal end ports of each of the 2×2 devices in the m tier of the multi-tiered cascaded array.

28. A bidirectional 1×2 optical demultiplexing and 2×1 optical multiplexing arrangement arranged from bidirectional 2×2 devices each having a proximal end and a distal end, where signals forward propagate from proximal end to distal end, and backward propagate from distal end to proximal end, and further each bidirectional 2×2 device having two proximal end ports, and two distal end ports, the arrangement comprising:

a first 2×2 device where each of the two proximal end ports is configured as a unidirectional port and each of the distal end ports is configured as a bidirectional port;

a second 2×2 device where one of the two proximal end ports is configured as a bidirectional port and each of the two distal end ports is configured as unidirectional port;

a third 2×2 device where one of the two proximal end ports is configured as a bidirectional port and each of the two distal end ports is configured as unidirectional port;

a first bidirectional transmission line coupling one of the bidirectional distal end ports of the first 2×2 device to one of the bidirectional proximal end ports of the second 2×2 device; and a second bidirectional transmission line coupling an other bidirectional distal end port of the first 2×2 device to one of the bidirectional proximal end ports of the third 2×2 device, wherein the input WDM signal received at one of the proximal end ports of the first 2×2 device forward propagates through the first 2×2 device and is demultiplexed into signals on each of the distal end ports of the first 2×2 device while constituent signals received at each of the distal end ports of the first 2×2 device backward propagate are simultaneously multiplexed into an output WDM signal output at the other proximal end port of the first 2×2 device WDM signal.

* * * * *

UNITED STATES PATENT AND TRADEMARK OFFICE
CERTIFICATE OF CORRECTION

PATENT NO. : 6,782,157 B1
DATED : August 24, 2004
INVENTOR(S) : Huali Ariel Luo et al.

It is certified that error appears in the above-identified patent and that said Letters Patent is hereby corrected as shown below:

Title page,
Item [57], ABSTRACT,
Line 1, delete "The abstract is amended to read,""
Line 9, delete " " " after the period.

Column 2,
Line 7, after "port", delete "FL"

Column 3,
Line 13, after "function", delete "A".
Line 41, after "1x2" change "devices" to -- device --.

Column 4,
Line 5, after "device", change "$101_1$" to -- $110_1$ --.

Column 6,
Line 27, after "functions", change "is" to -- are --.
Line 40, change "224," to -- $224_1$ --.
Line 43, change "2021" to -- $202_1$ --.
Line 43, change "2103" to -- $210_3$ --.
Line 53, change "2101" to -- $210_1$ --.
Line 54, change "$202^1$" to -- $202_1$--.
Line 55, change "205," to -- $205_1$ --.
Line 58, change "2101" to -- $210_1$ --.

Column 7,
Line 66, change "$225_3$" to -- $235_3$ --.

Column 8,
Line 25, change "$225_2$ and $225_3$" to -- $235_2$ and $235_3$ --.
Line 26, change "$225_2$" to -- $235_2$ --.
Line 28, change "optical path 217" to -- optical path 233 --.
Line 34, change "λBB" to -- λ4B --.
Line 36, change "$225_1$" to -- $235_1$ --.
Line 51, change "235," to -- $210_1$ --.
Line 53, change "$225_1$" to -- $210_1$ --.
Line 59, after "λ4B", insert -- ) --.
Line 60, after "received", change "a" to -- at --.
Line 61, before "227", insert -- ( --.

UNITED STATES PATENT AND TRADEMARK OFFICE
CERTIFICATE OF CORRECTION

PATENT NO. : 6,782,157 B1
DATED : August 24, 2004
INVENTOR(S) : Huali Ariel Luo et al.

It is certified that error appears in the above-identified patent and that said Letters Patent is hereby corrected as shown below:

Column 9,
Line 26, after "8x1", delete -- rat --.
Line 38, change "is performed" to -- are performed --.
Line 67, change "being forming" to -- being formed from --.

Column 10,
Line 1, change "$302_5$" (first occurrence), to -- $302_4$ --.
Line 3, change "302," to -- $302_1$ --.
Line 11, change "315," to -- $315_1$ --.
Line 11 change "302," to -- $302_1$ --.
Line 37, change "odd channels" to -- odd-numbered channels --.

Column 13,
Line 4, after "eighth subset" insert -- of --.

Column 14,
Line 37, after "379" delete -- ) --.

Column 15,
Line 30, change "propagates" to -- propagate --.
Line 54, change "the claim that follow" to -- the claims that follow --.

Column 16,
Line 39, after "comprising the steps of:", insert a paragraph break.

Column 17,
Line 54, change "further including an" to -- further including a --.

Column 18,
Line 13, change "of claim, 20", to -- of claim 20 --.
Lines 40 and 43, change "propagating" to -- propagate --.
Line 60, before "Fourier filter," change "an" to -- a --.
Line 65, change "the m tier" to -- the $m^{th}$ tier --.

Column 19,
Lines 12 and 16, change "ports is" to -- ports are --.
Lines 13 and 17, change last word "port" to -- ports --.

UNITED STATES PATENT AND TRADEMARK OFFICE
CERTIFICATE OF CORRECTION

PATENT NO. : 6,782,157 B1
DATED : August 24, 2004
INVENTOR(S) : Huali Ariel Luo et al.

It is certified that error appears in the above-identified patent and that said Letters Patent is hereby corrected as shown below:

Column 20,
Line 3, change "an other" to -- another --.
Line 15, after "propagate", insert -- and --.

Signed and Sealed this

Twenty-ninth Day of March, 2005

JON W. DUDAS
*Director of the United States Patent and Trademark Office*